(12) United States Patent
Hagen et al.

(10) Patent No.: US 11,882,148 B1
(45) Date of Patent: Jan. 23, 2024

(54) AUTOMATED MITIGATION OF CYBER THREATS USING A SEMANTIC CYBERSECURITY DATABASE

(71) Applicant: Trend Micro Incorporated, Tokyo (JP)

(72) Inventors: Josiah Dede Hagen, Austin, TX (US); David Girard, Montreal (CA); Jonathan Edward Andersson, Round Rock, TX (US); Vincenzo Ciancaglini, Rueil-Malmaison (FR); Jannis Weigend, Taipei (TW); Ahmed M. Ibrahim, Alexandria (EG); Mikhail Gorbulev, Prague (CZ)

(73) Assignee: Trend Micro Incorporated, Tokyo (JP)

( * ) Notice: Subject to any disclaimer, the term of this patent is extended or adjusted under 35 U.S.C. 154(b) by 311 days.

(21) Appl. No.: 17/229,248

(22) Filed: Apr. 13, 2021

Related U.S. Application Data (60) Provisional application No. 63/164,806, filed on Mar. 23, 2021.

(51) Int. Cl.
*H04L 9/40* (2022.01)
*G06F 16/903* (2019.01)

(52) U.S. Cl.
CPC .... *H04L 63/1441* (2013.01); *G06F 16/90335* (2019.01)

(58) Field of Classification Search
CPC ............ H04L 63/1441; G06F 16/90335
See application file for complete search history.

(56) References Cited

U.S. PATENT DOCUMENTS

| | | | | |
|---|---|---|---|---|
| 5,948,104 A | * | 9/1999 | Gluck | G06F 21/564 713/188 |
| 8,543,834 B1 | * | 9/2013 | Barra | G06F 21/32 726/16 |
| 9,305,106 B1 | * | 4/2016 | Wang | H04L 63/0227 |

(Continued)

OTHER PUBLICATIONS

Phipps et al., "Enhancing Cyber Security Using Audio Techniques: A Public Key Infrastructure for Sound", Jan. 2021, IEEE 19th International Conference on Trust, Security and Privacy in Computing and Communications, pp. 1428-1436 (Year: 2021).*

(Continued)

*Primary Examiner* — Kenneth W Chang
(74) *Attorney, Agent, or Firm* — Beyer Law Group LLP (57) ABSTRACT

Systems and methods are presented for mitigating cyber threats. Cybersecurity-related data are stored in a semantic cybersecurity database. A user interface converts a user input to a command utterance. A command node that corresponds to the command utterance is identified in the cybersecurity database. The command node is resolved to one or more action nodes that are connected to the command node, and each action node is resolved to one or more parameter nodes that are connected to the action node. The command node has a command that implements actions indicated in the action nodes. Each action can have one or more required parameters indicated in the parameter nodes. The values of the required parameters are obtained from the command utterance, prompted from the user, or obtained from the cybersecurity database. Actions with their parameter values are executed to mitigate a cyber threat in accordance with the user input.

15 Claims, 6 Drawing Sheets

(56) References Cited

U.S. PATENT DOCUMENTS

| | | | | |
|---|---|---|---|---|
| 2004/0044516 | A1* | 3/2004 | Kennewick | G10L 15/1822 704/E15.04 |
| 2006/0218635 | A1* | 9/2006 | Kramer | H04L 69/40 726/22 |
| 2006/0229022 | A1* | 10/2006 | Bu | H04L 63/1458 455/425 |
| 2008/0127336 | A1* | 5/2008 | Sun | G06F 21/566 726/22 |
| 2008/0276234 | A1* | 11/2008 | Taylor | G06F 8/60 717/177 |
| 2014/0199664 | A1* | 7/2014 | Sadeh-Koniecpol | G06F 21/564 434/118 |
| 2016/0164919 | A1* | 6/2016 | Satish | G06F 21/554 726/1 |
| 2018/0300474 | A1* | 10/2018 | Yamada | G06F 21/53 |
| 2019/0182072 | A1* | 6/2019 | Roe | H04W 4/21 |
| 2019/0236140 | A1* | 8/2019 | Canim | G06F 40/30 |
| 2019/0236469 | A1* | 8/2019 | Canim | G06N 5/022 |
| 2020/0077155 | A1* | 3/2020 | Bryant | H04N 21/4828 |

OTHER PUBLICATIONS

Florin Brad, et al. "Dataset for a Neural Natural Language Interface for Databases (NNLIDB)", Jul. 11, 2017, pp. 1-13, University Politehnica of Bucharest, Bitdefender, Romania.

TLSH—Trend Micro Locality Sensitive Hash, 9 sheets [retrieved on May 17, 2021], retrieved from the internet: https://github.com/trendmicro/tlsh.

OASIS—STIX Version 2.1, 3 sheets [retrieved on May 17, 2021], retrieved from the internet: https://docs.oasis-open.org/cti/stix/v2.1/cs01/stix-v2.1-cs01.html#_tumklw3o2gyz.

OASIS Collaborative Automated Course of Action Operations (CACAO) for Cyber Security TC, 7 sheets [retrieved on May 17, 2021], retrieved from the internet: https://www.oasis-open.org/committees/tc_home.php?wg_abbrev=cacao.

OpenC2Orchestration vs the Cyber Kill Chain, 9 sheets [retrieved on May 17, 2021], retrieved from the internet: https://medium.com/swlh/openc2-orchestration-vs-the-cyber-kill-chain-8cfcbde96763.

OpenCTI-Platform / opencti, 10 sheets [retrieved on May 17, 2021], retrieved from the internet: https://github.com/OpenCTI-Platform/opencti/releases.

Amazon Lex—AWS Chatbot AI, 9 sheets [retrieved on Oct. 8, 2020], retrieved from the internet: https://aws.amazon.com/lex/.

Blake E. Strom, et al. "MITRE ATT&CK: Design and Philosophy", Jul. 2018, 37 sheets, The MITRE Corporation, Mclean, VA.

Mari Gronberg "An Ontology for Cyber Threat Intelligence", 2019, 100 sheets Thesis, Department of Informatics Faculty of mathematics and natural sciences, University of Oslo, Norway.

* cited by examiner

AUTOMATED MITIGATION OF CYBER THREATS USING A SEMANTIC CYBERSECURITY DATABASE

REFERENCE TO RELATED APPLICATION

The present application claims the benefit of U.S. Provisional Application No. 63/164,806, filed on Mar. 23, 2021, which is incorporated herein by reference in its entirety.

BACKGROUND OF THE INVENTION

1. Field of the Invention

The present invention relates generally to cybersecurity, and more particularly but not exclusively to automating responses to cyber threats.

2. Description of the Background Art

Cybersecurity organizations have compiled a large amount of data relating to cyber threats. These cybersecurity-related data include information on detecting and mitigating particular cyber threats. However, even with vast amounts of available cybersecurity-related data, it is difficult for the average user to respond to a cyber threat. First, because of the ever increasing number of cyber threats in the wild, users typically receive many detection alerts that need attention. Second, most users do not have enough knowledge of cybersecurity products to configure the product to mitigate a particular cyber threat. Third, cybersecurity-related data are typically stored in databases that are relatively difficult to access and comprehend.

SUMMARY

In one embodiment, cybersecurity-related data are stored in a semantic cybersecurity database. A user interface converts a user input to a command utterance. A command node that corresponds to the command utterance is identified in the semantic cybersecurity database. The command node is resolved to one or more action nodes that are connected to the command node, and each action node is resolved to one or more parameter nodes that are connected to the action node. The command node specifies a command that implements actions indicated in the action nodes. Each action may have one or more required parameters indicated in the parameter nodes. The values of the required parameters are obtained from the command utterance, prompted from the user, or obtained from the semantic cybersecurity database. Actions with their parameter values are executed to mitigate a cyber threat in accordance with the user input.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
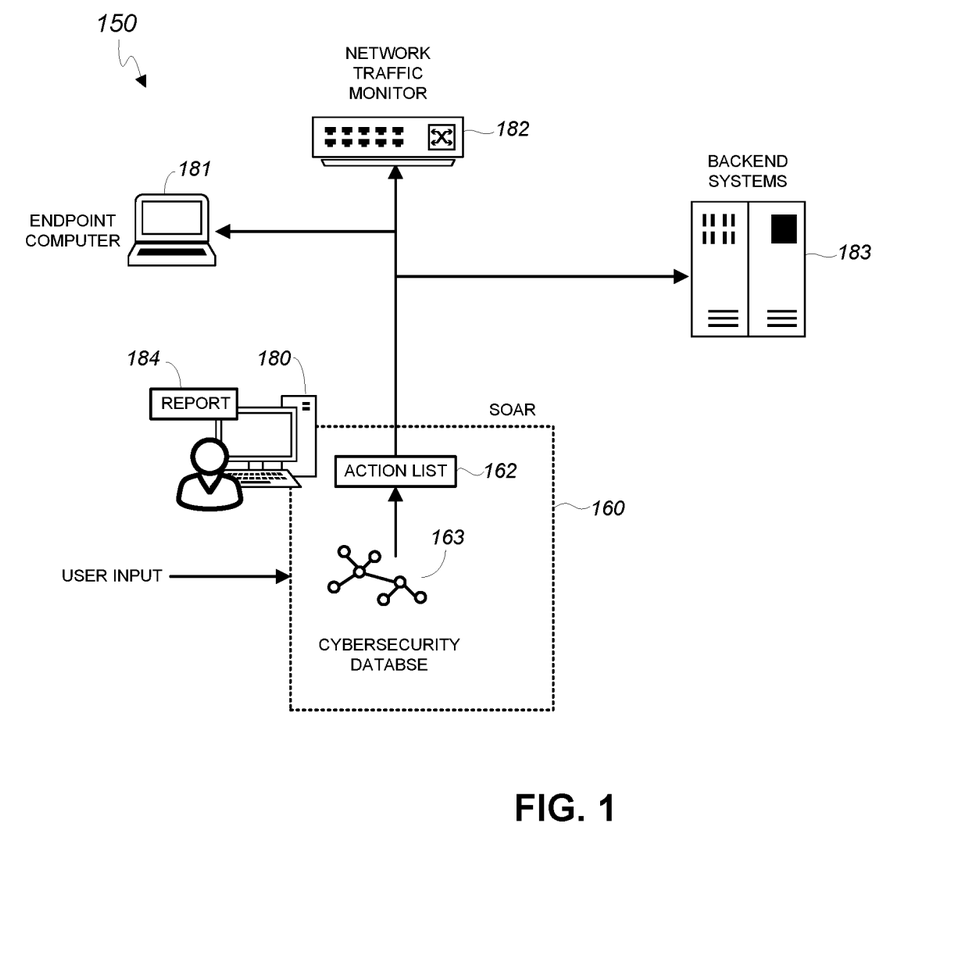
FIG. 1 shows a system for mitigating cyber threats in accordance with an embodiment of the present invention.

FIG. 1 shows a system 150 for mitigating cyber threats in accordance with an embodiment of the present invention. In the example of FIG. 1, the system 150 includes a Security Orchestration Automation and Response (SOAR) module 160 that is running on a host computer system 180. The host computer system 180 may comprise one or more server computers, an infrastructure of a cloud computing environment (e.g., AMAZON EC2 web service), or other computing platform. In one embodiment, the SOAR module 160 is implemented in software, i.e., instructions stored in the main memory of the host computer system 180 that, when executed by at least one processor of the host computer system 180, cause the host computer system 180 to perform the functionality of the SOAR module 160 as described herein. A user may access the SOAR module 160 directly by way of a user interface of the host computer system 180, such as a keyboard and monitor, a microphone, or some other user interface that is connected to the host computer system 180. The user may also access the SOAR module 160 by way of a user interface that is connected to another computer (not shown) that communicates with the host computer system 180 over a computer network.

The SOAR module 160 includes a semantic cybersecurity database 163 containing cybersecurity-related data. As its name indicates, the database 163 is a semantic database, which in the example of FIG. 1 is a Resource Description Framework (RDF) graph database. The database 163 may be implemented using the Ontotext GraphDB™ graph database software, for example. The database 163 includes, among other information, actions to perform to mitigate a cyber threat.

In one embodiment, the SOAR module 160 receives a user input from the user. The user input may be a command to mitigate a cyber threat. The user input may be in text, audio, or other form. The SOAR module 160 is configured to convert the user input to a command utterance in text form. The SOAR module 160 identifies in the database 163 a command that corresponds to the command utterance, queries the database 163 for actions of the command, queries the database 163 for required parameters of the actions, obtains values of the required parameters of the actions, and generates an action list 162 that list the actions and their respective parameter values.

An action in the action list 162 may be executed to mitigate a cyber threat. For example, the user input may be a command to generate a report 184, such as a dashboard that displays information about cyber threats that were detected during a particular time period. In that case, the action may be the generation and presentation of a dashboard that shows the requested information.

As another example, the user input may be a command to block a particular cyberattack. In that case, the action may identify, based on data in the database 163, a filter that can detect and stop the cyberattack. The action may be sent to the network traffic monitor 182 for implementation. The network traffic monitor 182 may install and activate the filter indicated in the action. The network traffic monitor 182 may monitor network traffic of a computer network and block data packets detected by the filter to be indicative of the cyberattack.

As another example, the user input may be a command to block a particular computer virus. In that example, the action may indicate raising a security level as a response against the computer virus. The action may be sent to an endpoint computer 181. Cybersecurity software in the endpoint computer 181 may receive the action and, in response, raise the security level of the endpoint computer as indicated in the action.

The one or more actions in an action list 162 may also be sent to one or more backend systems 183. A backend system 183 may comprise a server computer and associated software for providing a data warehouse of additional cybersecurity-related information, a sandbox for detonating and analyzing samples, a machine learning system, and/or other external service.

For example, the user input may be a command to receive security features of an artifact (e.g., an executable file). In that example, the action list 162 may be sent to a backend system 183 that hosts a behavioral analysis sandbox, such as the Cuckoo Sandbox for Win32 PE file. Data resulting from the behavioral analysis may be stored in the same or another backend system 183 that serves as a data warehouse. The command may be in the form "Detonate SHA1 {ad657a5d6a7d56a7d5}", where "SHA1 {ad657a5d6a7d56a7d5}" is the hash of the executable file to be analyzed in the sandbox. The action list 162 may include the following actions indicated in brackets (i.e., "[ACTION]") and parameter values indicated in curly brackets (i.e., "{PARAMETER}"):

(1) [fetch sample] for {SHA1} from a malware repository (e.g., using the VirusTotal API);
(2) [submit sample] to {sandbox};
(3) [send behavioral report] on {SHA1} to user (e.g. as raw text in a user interface, by email); and
(4) [store the behavioral report data in a data warehouse].

As another example, the user input may be a command to receive background information that includes security features of an artifact. In that example, the command may be in the form "Get background on {artifact}" and the action list 162 may include the following actions:

(1) [fetch metadata] for {artifact} from data warehouse;
(2) [convert relational data to graph data] {results of (1)}; and
(3) [popup an interactive graph] containing {results of (2)}.

As another example, the user input may be a command to find samples that are similar to a local artifact. In that example, the command may be in the form "Determine similar samples to local artifact '/home/Josiah/malware.exe'" and the action list 162 may include the following actions:

(1) [calculate TLSH] for {local artifact}, where TLSH is the Trend Micro Locality Sensitive Hash and the local artifact is a local file;
(2) [find nearest neighbors] for {TLSH above}, where the backend system 183 hosts a data warehouse of clusters of stored TLSHs of sample files and searches the data warehouse for stored TLSHs that are similar (e.g., within a mathematical distance) to the TLSH of the local file; and
(3) [display name and label of sample files] {results of above}, where label indicates a classification of the sample file (e.g., malicious, normal), with the label being obtained from the same backend system 183 that stores the clusters of TLSHs or a different backend system 183 that hosts a label repository.

As another example, the user input may be a command to label an artifact, such as a local file. In that example, the command may be in the form "Label local file | SHA1", where SHA1 is the hash of the local file. The action list 162 may include the following actions:

(1) [classify sample] {local artifact}, where the classification is performed by a backend system 183 that provides sandboxing, machine learning classification, web reputation service, etc.;
(2) [report label {SHA1}] {label from (1)}, where the report is displayed in a user interface, sent as an email, etc.; and
(3) [store the label in the backend data warehouse].

As can be appreciated, actions included in an action list 162 depend on the particulars of the cybersecurity application.

Figure 2:
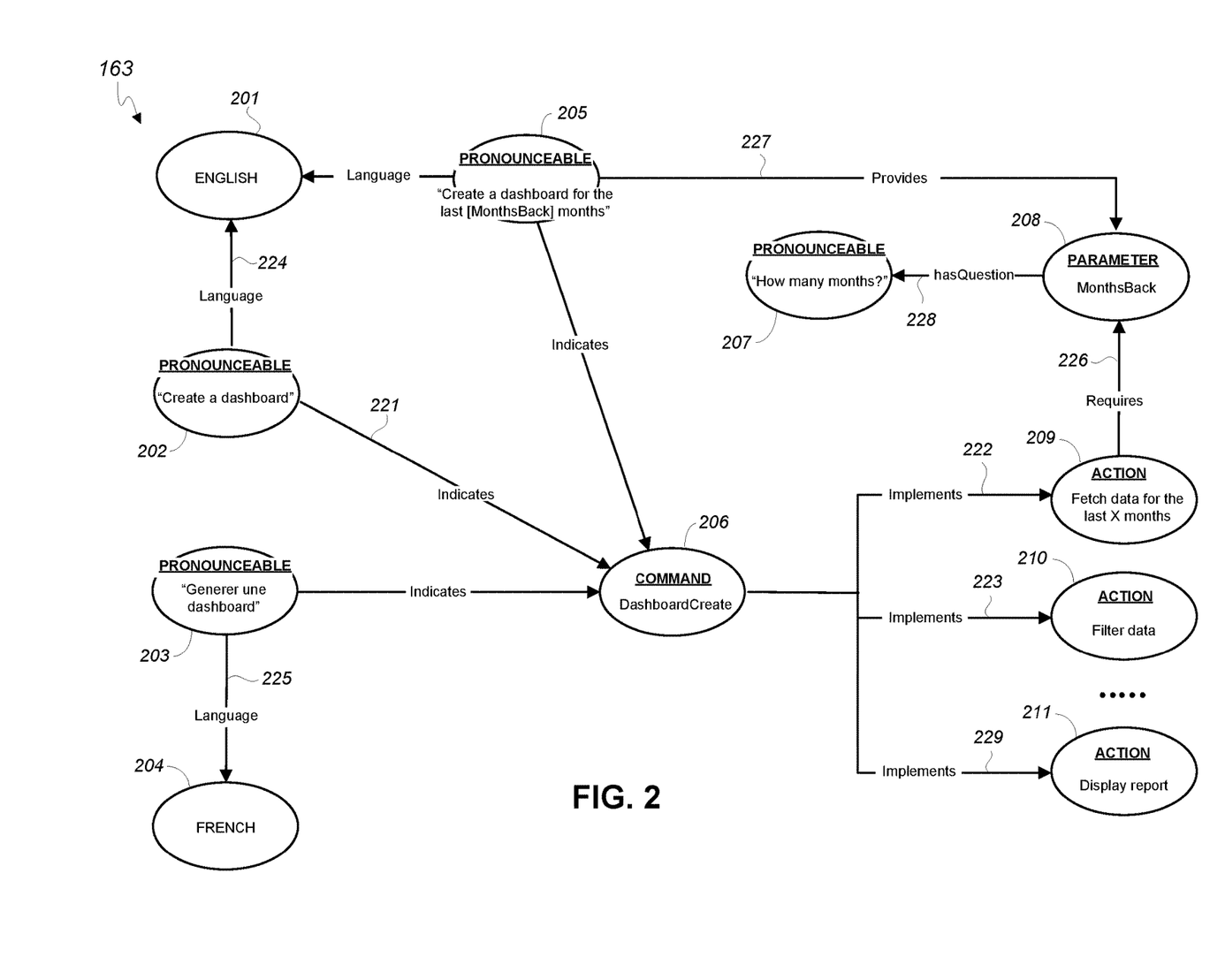
FIG. 2 shows a portion of an example semantic cybersecurity database in accordance with an embodiment of the present invention.

FIG. 2 shows a portion of an example semantic cybersecurity database 163 in accordance with an embodiment of the present invention. In accordance with the RDF schema, data in the database 163 are represented as a semantic triple, i.e., a set of three entities, in the form:

SUBJECT—PREDICATE—OBJECT, where predicate indicates a relationship between the subject and the object. In the database 163, the subject and object are represented as nodes, and the predicate is represented as an edge that connects the subject to the object. The direction of an edge points to a node that represents an object. As can be appreciated, the database 163 may be stored and processed as a data structure or be displayed pictorially on a display screen.

In one embodiment, the subjects, predicates, and objects are defined based on their class property in the database 163. For example, the predicate "indicates" (e.g., see edge 221) associates a pronounceable node (e.g., see node 202) with a command node (e.g., see node 206). As another example, the predicate "implements" (e.g., see edge 222) associates a command node (e.g., see node 206) with an action node (e.g., see node 209). Yet another example, the predicate "requires" (e.g., see edge 226) associates an action node (e.g., see node 209) with a parameter node (e.g., see node 208). A subject is a node that is an instance of the domain of a predicate, and an object is a node that is an instance of the range of a predicate.

In the field of computer science, a natural language refers to a human language (e.g., English or French language), which is distinguished from an artificial language that is used to communicate with computers. A subject, predicate, or object may have an associated label, as referred to in the Simple Knowledge Organization System (SKOS), that describes the subject, predicate, or object in the natural language. A natural language label may be specified directly or identified by a Uniform Resource Identifier (URI), such as a Uniform Resource Locator (URL), or by any pointer into another SKOS. A subject, predicate, or object that has an associated natural language label is also referred to herein as "pronounceable."

A command utterance may be in text form, i.e., in human-readable format. A pronounceable node has a value that corresponds to a natural language, such as "Create a dashboard" in the case of the pronounceable node 202. Accordingly, a command utterance may be matched to a pronounceable node in the database 163. As can be appreciated, matching a command utterance to a pronounceable node does not require an exact match. A natural language processing system may be trained to find a pronounceable node with a value that most closely matches the command utterance among the plurality of pronounceable nodes in the database 163.

In the database 163, the predicate "language" (e.g., see edge 224) associates a pronounceable node (e.g., see node 202) with a natural language (e.g., see node 201). For example, the edge 224 informs that "Create a dashboard" of the pronounceable node 202 is in the English language. As another example, the edge 225 informs that "Generer une dashboard" of the pronounceable node 203 is in the French language. The knowledge base 163 may be configured to support fewer or more natural languages.

A pronounceable node with an "indicates" predicate has a corresponding command node. A command node specifies a command to be performed in accordance with the command utterance. For example, a command utterance that matches the pronounceable node 202 indicates executing the "DashboardCreate" command of the command node 206. A pronounceable node may be resolved to a corresponding command node by querying the database 163. In one embodiment, queries performed on the database 163 are in accordance with the SPARQL RDF Query Language.

A pronounceable node may be connected to a parameter node by a "provides" predicate (e.g., see edge 227). This is the case when the pronounceable node matches a command utterance that includes a parameter value. For example, the pronounceable node 205 matches to a command utterance "Create a dashboard for the last {MonthsBack} months", with {MonthsBack} being a slot for receiving a value of the parameter "MonthsBack" of the parameter node 208 as indicated by a "provides" predicate (see edge 227).

A command node is an entity of the database 163 that specifies a command. A command node has an "implements" predicate to one or more action nodes, with each action node specifying an action to be implemented as part of the command. For example, the "DashboardCreate" command of the command node 206 implements the actions of: (a) fetching data for the last X months as specified in the action node 209 (see edge 222); (b) filtering data as specified in the action node 210 (see edge 223); and (c) displaying the report as specified in the action node 211 (see edge 229). A command node may be resolved to corresponding action nodes by querying the database 163.

An action node specifies one or more tasks, which are also referred to as "actions". A plurality of actions may be performed sequentially or in parallel. An action may require one or more parameters for execution. An action is an atomic entity in the database 163 in that the action may be fulfilled when all of the action's parameters and corresponding parameter values are obtained. An action node that specifies an action that requires a parameter has a "requires" predicate that is connected to a parameter node, which specifies a parameter of the action. For example, the action of fetching data for the last X months of the action node 209 requires a parameter "MonthsBack" of the parameter node 208 (see edge 226). An action node may be resolved to required parameter nodes by querying the database 163.

A parameter value may be obtained from the command utterance. If not, the user may be prompted to provide the parameter value or a default parameter value that is encoded in the database 163, if present, may be used. A parameter node may be connected by a "hasQuestion" predicate (e.g., see edge 228) to a pronounceable node that holds a question, in a corresponding natural language, for prompting the user for a parameter value. For example, the parameter "MonthsBack" of the parameter node 208 is connected by a predicate "hasQuestion" (see edge 228) to a pronounceable node 207, which holds the question "How many months?" The question may be displayed to the user to prompt the user to provide the number of months (i.e., value of parameter "MonthsBack") worth of information to be included in the dashboard commanded by the user.

As can be appreciated, the number, types, and values of the nodes of the database 163 may be tailored to address mitigations supported by the SOAR module 160. For example, an additional pronounceable node may hold the value "Block {Virus}", which indicates a command node with a command that implements an action of an action node for blocking a virus, with {Virus} (i.e., name of the virus) as a required parameter indicated in a parameter node connected to the action node. The name of the virus may be obtained from the command utterance (e.g., "Block WannaCry", with "WannaCry" as the virus name) or prompted from the user by presenting a question of a connected pronounceable node. The actions for blocking the virus may include implementing a standard playbook for blocking the virus, installing a filter that is known to detect and block the virus, etc.

Figure 3:
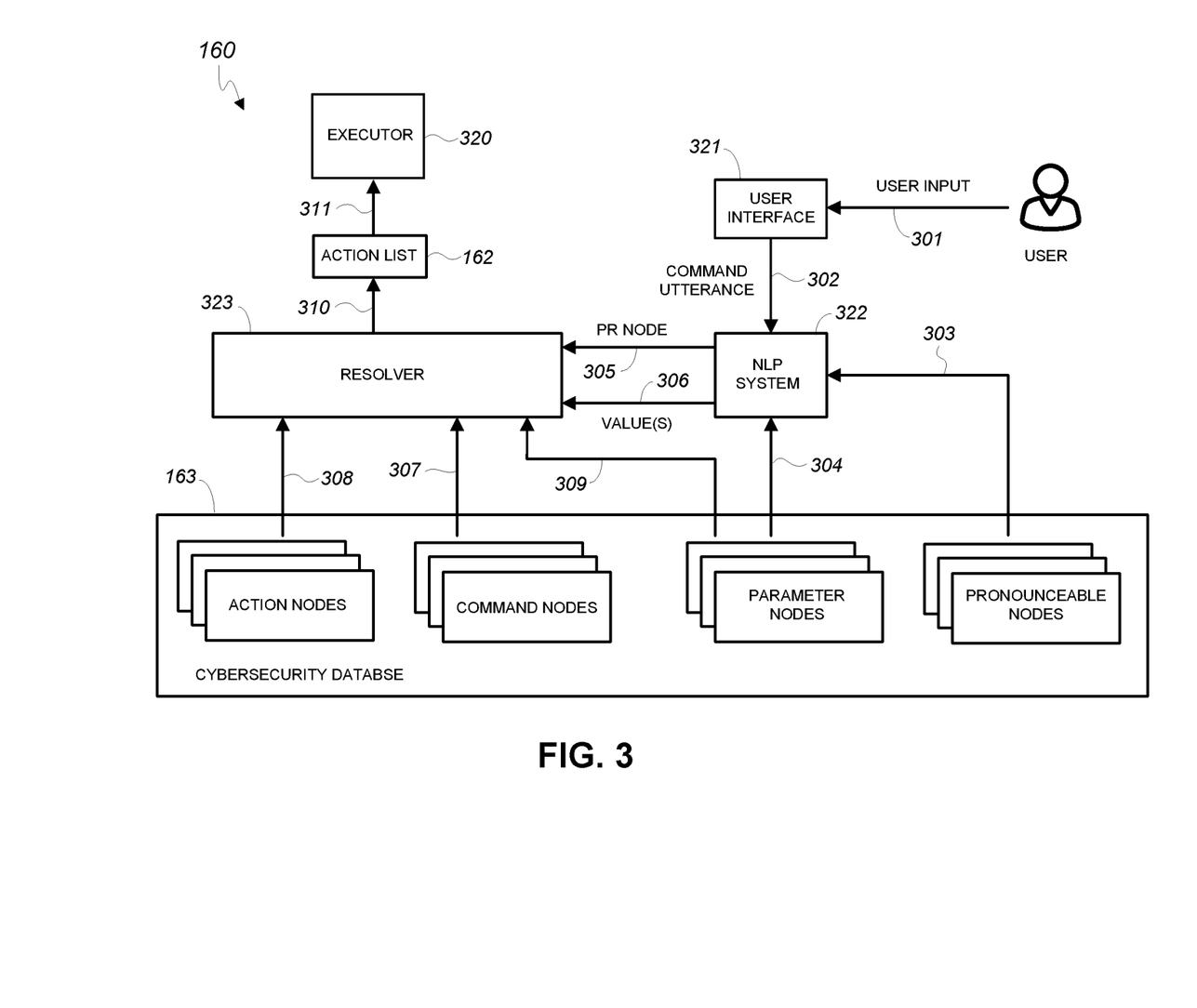
FIG. 3 shows a logical diagram of a Security Orchestration Automation and Response (SOAR) module in accordance with an embodiment of the present invention.

FIG. 3 shows a logical diagram of the SOAR module 160 in accordance with an embodiment of the present invention. In the example of FIG. 3, a user interface 321 is configured to receive a user input (see arrow 301) in a natural language (e.g., English language) that is supported by the database 163 and to convert the user input into a command utterance that is provided to an NLP system 322 (see arrow 302). For example, the user interface 321 may be configured to perform speech to text conversion to generate the command utterance when the user input is in audio format (e.g., as entered using a microphone). As another example, the user interface 321 may receive the user input from a keyboard. The user interface 321 may be implemented using the SLACKBOT chatbot, Zoom™ speech recognition interface, Alexa™ speech recognition interface, etc.

In the example of FIG. 3, the NLP system 322 is trained to identify, from a command utterance in a natural language, a closest matching pronounceable node in the database 163 (see arrow 303). That is, the NLP system 322 identifies a matching pronounceable node, among the plurality of pronounceable nodes in the database 163, that has a value that most closely resembles the command utterance. The NLP system 322 is further trained to detect one or more parameter values of parameters of parameter nodes (see arrow 304) that may be present in the command utterance. In one embodiment, the NLP system 322 is implemented using the AMAZON LEX system. Other suitable NLP systems may also be employed without detracting from the merits of the present invention.

The resolver 323 is configured to receive, from the NLP system 322, the matching pronounceable node (see arrow 305) and any parameter value that is present in the command utterance (see arrow 306). The resolver 323 is configured to resolve the matching pronounceable node to a command node in the database 163 (see arrow 307), e.g., by querying the database 163 to find a command node that is connected to the matching pronounceable node by an "indicates" predicate.

The resolver 323 is configured to resolve the command node to one or more corresponding action nodes that are included in the database 163 (see arrow 308). For example, the resolver 323 may query the database 163 to find one or more action nodes that are connected to the command node by an "implements" predicate. The resolver 323 is further configured to resolve each of the action nodes to one or more corresponding parameter nodes that are included in the database 163 (see arrow 309). For example, the resolver 323 may query the database 163 to find one or more parameter nodes that are connected to the action node by a "requires" predicate.

Parameter values may be obtained from the command utterance. The user may also be prompted to provide parameter values. For example, the resolver 323 may query the database 163 for a pronounceable node that is connected to a parameter node by a "hasQuestion" predicate to retrieve a question for prompting the user to provide the value of a parameter of the parameter node. A parameter may also have a default parameter value that is encoded in the database 163.

The resolver 323 is configured to assemble the action nodes and their parameter values into an action list 162 (see arrow 310). The action list 162 includes one or more actions of the action nodes and, for each action, one or more parameter values required by the action. The executor 320 receives the action list 162 (see arrow 311) and initiates execution of actions indicated in the action list 162.

For example, an action list 162 may include a first action comprising a listing of filters to be deployed in a network traffic monitor in response to a user input to block a particular virus. The executor 320 may send the first action to the network traffic monitor, which implements the first action by installing and activating a filter indicated in the first action. The network traffic monitor may block network traffic detected by the filter as malicious. As another example, the action list 162 may include a second action that indicates raising a security level in response to a user input to block an Advanced Persistent Threat (APT). The executor 320 may send the second action to an endpoint computer, which interprets the second action by raising a security level of cybersecurity software running on the endpoint computer. As another example, the action list 162 may include a third action to display a dashboard of security events in response to a user input to provide a report of security events. The executor 320 may execute the third action by generating and displaying the dashboard. Yet another example, the executor 320 may send the action list 162 to a backend system, which executes or initiates execution of actions to perform sandbox analysis, obtain information on security features of artifacts (e.g., files), find similar artifacts, assign a classification label to an artifact, etc.

Figure 4:
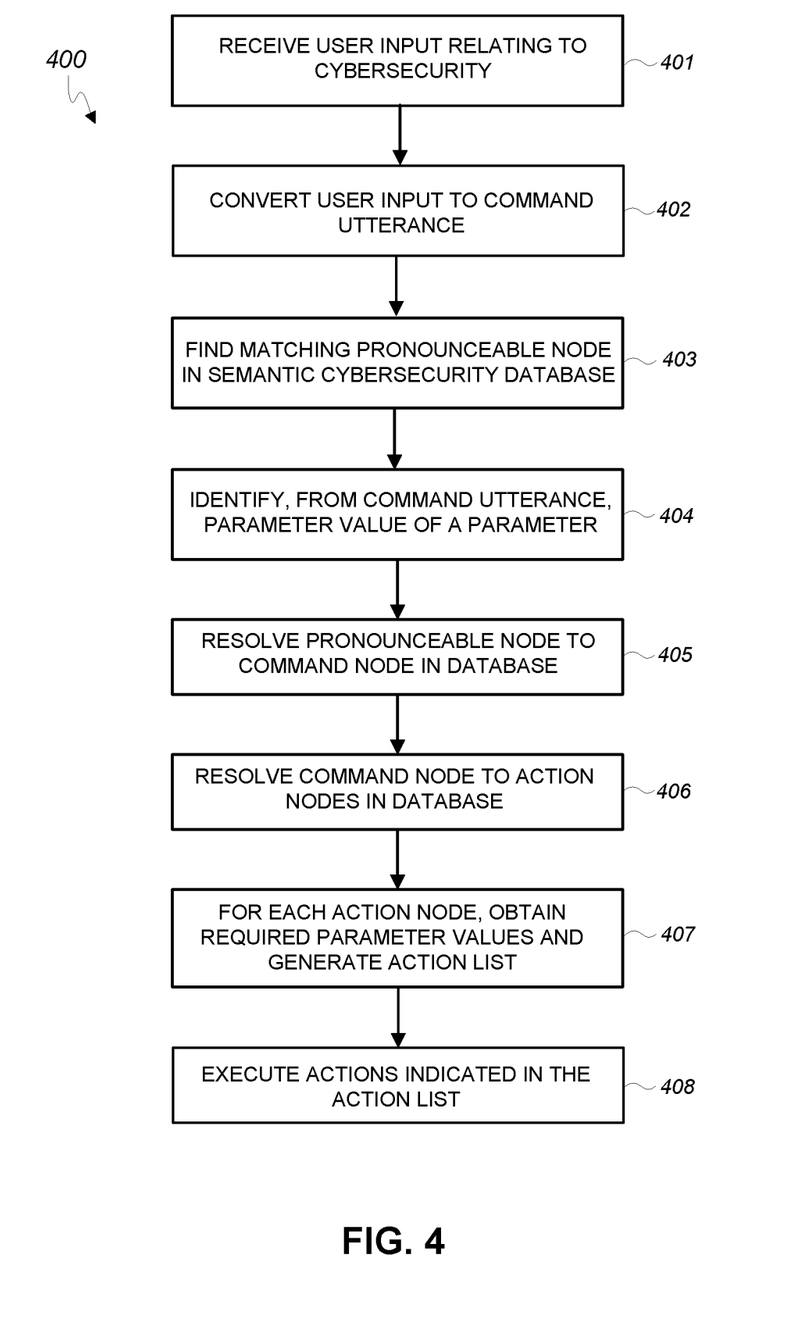
FIG. 4 shows a flow diagram of a method of mitigating cyber threats in accordance with an embodiment of the present invention.

FIG. 4 shows a flow diagram of a method 400 of mitigating cyber threats in accordance with an embodiment of the present invention. The method 400 may be performed by an SOAR module that is running on a host computer. As can be appreciated, other components may also be employed without detracting from the merits of the present invention.

In the example of FIG. 4, a user interface receives a user input relating to cybersecurity (step 401). The user interface converts the user input to a command utterance (step 402), which is provided to an NLP system. The NLP system finds a pronounceable node, in a sematic cybersecurity database, that matches the command utterance (step 403). More particularly, the NLP system finds a pronounceable node that most closely matches the command utterance among pronounceable nodes in the cybersecurity database. The NLP system identifies a parameter value of a parameter that may be present in the command utterance (step 404). A resolver resolves the matching pronounceable node to a command node in the semantic cybersecurity database (step 405). The resolver resolves the command node to corresponding action nodes in the semantic cybersecurity database (step 406). For each action node, the resolver resolves the action node to corresponding parameter nodes in the semantic cybersecurity database, obtains the values of parameters of the corresponding parameter nodes, and generates an action list of actions and their parameter values (step 407). An executor executes or initiates execution of actions in the action list (step 408).

Figure 5:
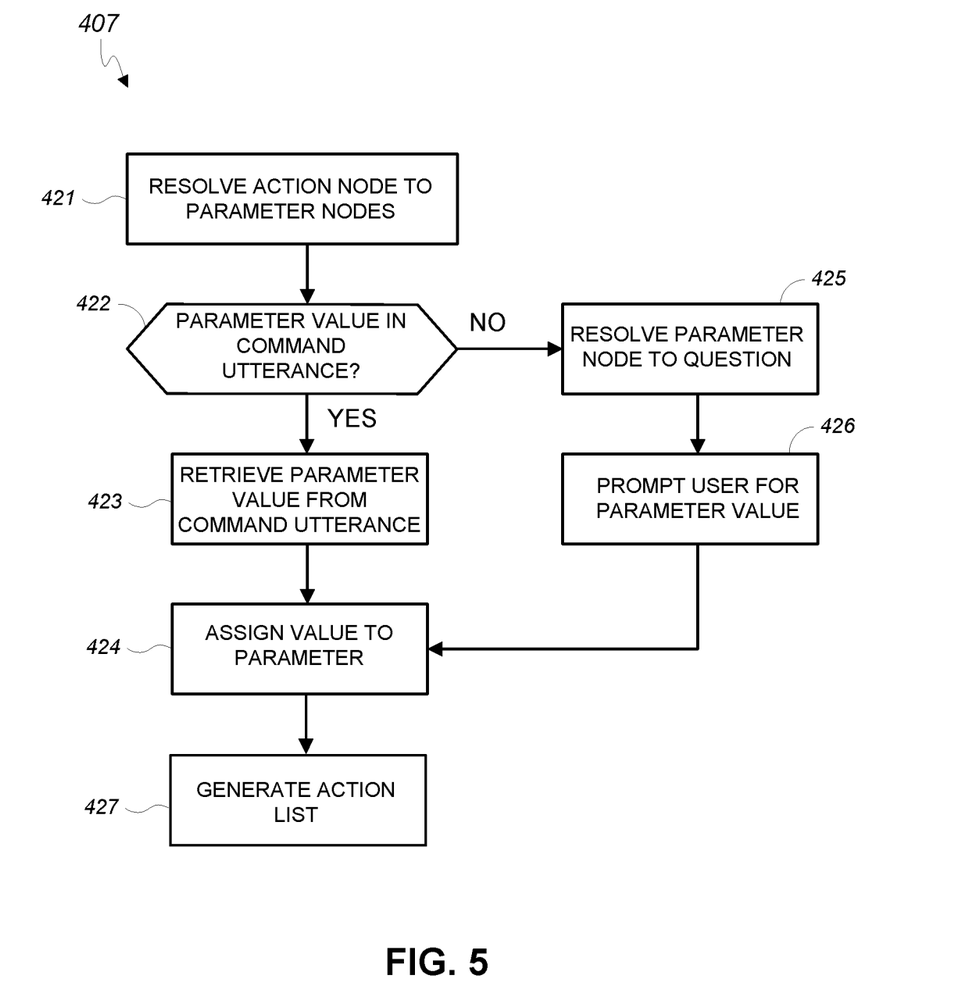
FIG. 5 shows a flow diagram of a step of the method of FIG. 4 in accordance with an embodiment of the present invention.

FIG. 5 shows a flow diagram of the step 407 of the method 400 in accordance with an embodiment of the present invention. In the example of FIG. 5, for each action node, the resolver resolves the action node to corresponding parameter nodes (step 421). The resolver then obtains the values of parameters of the parameter nodes. If a parameter value can be found in the command utterance (step 422 to step 423), the NLP system retrieves the parameter value from the command utterance and provides the parameter value to the resolver (step 423), which assigns the parameter value to the parameter (step 424). Otherwise, if the parameter value is not included in the command utterance (step 422 to step 425), the resolver resolves the parameter node to a pronounceable node that holds a question for prompting the user to provide the parameter value (step 425). The resolver prompts the user to provide the parameter value by presenting the question to the user (step 426). The resolver receives the parameter value from the user and assigns the parameter value to the parameter (step 424). A parameter may also have a default parameter value that is encoded in the semantic cybersecurity database. The resolver generates an action list that includes actions of action nodes and their parameter values (step 427).

Figure 6:
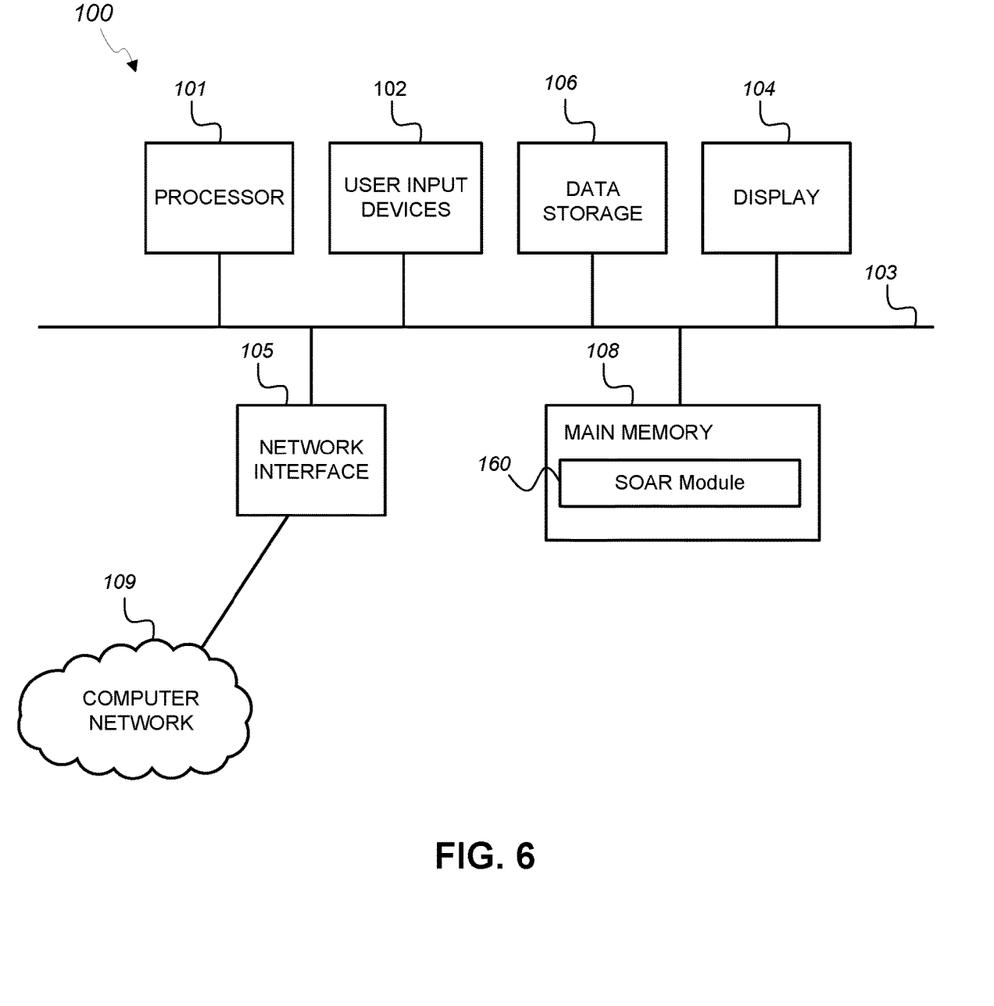
FIG. 6 shows a logical diagram of a computer system that may be employed with embodiments of the present invention.

Referring now to FIG. 6, there is shown a logical diagram of a computer system 100 that may be employed with embodiments of the present invention. The computer system 100 may be employed as a host of an SOAR module or as other computing devices described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

In one embodiment, the computer system 100 is configured as a host of the SOAR module 160, whose instructions are loaded in the main memory 108 for execution by the processor 101.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of mitigating a cyber threat, the method comprising:
   receiving a user input;
   converting the user input to a command utterance;
   identifying a command node that corresponds to the command utterance, the command node being an entity of a semantic cybersecurity database that specifies a command;
   querying the semantic cybersecurity database to resolve the command node to an action node in the semantic cybersecurity database, the action node specifying an action that is required to implement the command, the command node is a subject in a first semantic triplet of the semantic cybersecurity database, the action node is an object in the first semantic triplet, the command node and the action node are connected by a first edge that has a direction going from the command node to the action node, and the first edge is a predicate in the first semantic triplet;
   querying the semantic cybersecurity database to resolve the action node to a parameter node in the semantic cybersecurity database, the parameter node specifying a parameter for implementing the action, the action node is a subject in a second semantic triplet of the semantic cybersecurity database, the parameter node is an object in the second semantic triplet, the action node and the parameter node are connected by a second edge that has a direction going from the action node to the parameter node, and the second edge is a predicate in the second semantic triplet;
   generating an action list that includes the action and a parameter value of the parameter; and
   initiating execution of the action to mitigate a cyber threat in response to the user input.

2. The method of claim 1, wherein identifying the command node comprises:
   identifying, in the semantic cybersecurity database, a pronounceable node with a value that most closely matches the command utterance relative to values of other pronounceable nodes in the semantic cybersecurity database.

3. The method of claim 1, further comprising:
   retrieving the parameter value from the command utterance.

4. The method of claim 1, wherein the user input is a command to block a computer virus and the action indicates installing a filter for blocking the computer virus.

5. The method of claim 1, wherein the user input is a command to display a report of cybersecurity events and the action indicates displaying a dashboard of the cybersecurity events.

6. The method of claim 1, further comprising:
   resolving the parameter node to a pronounceable node for prompting a user for the parameter value.

7. A system for mitigating a cyber threat, the system comprising:
   a host computer system that hosts a semantic cybersecurity database, the host computer system comprising at least one processor and a memory that stores instructions that when executed by the at least one processor cause the host computer system to:
   receive a user input;
   convert the user input to a command utterance;
   identify a command node that corresponds to the command utterance, the command node being a node of the semantic cybersecurity database that specifies a command;
   query the semantic cybersecurity database to resolve the command node to an action node in the semantic cybersecurity database, the action node being connected to the command node by a first edge that has a direction going from the command node to the action node, the command node is a subject in a first semantic triplet of the semantic cybersecurity database, the action node is an object in the first semantic triplet, and the first edge is a predicate in the first semantic triplet;
   query the semantic cybersecurity database to resolve the action node to a parameter node in the semantic cybersecurity database, the parameter node is connected to the action node by a second edge that has a direction going from the action node to the parameter node, the action node is a subject in a second semantic triplet of the semantic cybersecurity database, the parameter node is an object in the second semantic triplet, and the second edge is a predicate in the second semantic triplet;
   generate an action list that includes an action of the action node and a parameter value of a parameter of the parameter node; and
   initiate execution of the action to mitigate a cyber threat in response to the user input; and
   a user interface that is configured to receive the user input.

8. The system of claim 7, wherein the user interface is a keyboard that is coupled to the host computer system.

9. The system of claim 7, wherein the user interface includes a microphone that receives the user input as speech and the user interface is configured to convert the speech to text of the command utterance.

10. The system of claim 7, further comprising:
    a network traffic monitor that is configured to receive the action, to install a filter indicated in the action, and to block network traffic detected by the filter as malicious.

11. The system of claim 7, further comprising:
    an endpoint computer that is configured to receive the action and to raise a security level of cybersecurity software running on the endpoint computer as indicated in the action.

12. The system of claim 7, further comprising:
    a backend system that is configured to receive the action, to retrieve an executable file, and to perform behavioral sandboxing analysis on the executable file,
    wherein the parameter value identifies the executable file.

13. The system of claim 7, further comprising:
    a backend system that is configured to receive the action and to provide information regarding an artifact,
    wherein the parameter value identifies the artifact.

14. The system of claim 7, further comprising:
    a backend system that is configured to receive the action and to identify one or more sample files that are similar to a target file,
    wherein the parameter value identifies the target file.

15. The system of claim 7, further comprising:
a backend system that is configured to receive the action and to classify an artifact,
wherein the parameter value identifies the artifact.

* * * * *